United States Patent [19]

Drori et al.

[11] Patent Number: 4,845,464

[45] Date of Patent: Jul. 4, 1989

[54] PROGRAMMABLE SENSOR APPARATUS

[75] Inventors: Ze'Ev Drori; Moti Segal, both of Chatsworth, Calif.

[73] Assignee: Clifford Electronics, Inc., Chatsworth, Calif.

[21] Appl. No.: 230,260

[22] Filed: Aug. 9, 1988

[51] Int. Cl.<sup>4</sup> .................... B60R 25/00; G08B 13/00
[52] U.S. Cl. .................... 340/429; 340/566; 340/590; 340/669; 340/665; 340/683; 73/DIG. 1; 73/669; 73/570; 364/431.08; 307/10.2
[58] Field of Search ............ 340/63, 65, 566, 582, 340/587, 590, 669, 665, 683; 73/12, 35, 570, 496, 651, 609, 669, DIG. 1; 364/431.08, 431.04, 431.12; 307/10 R

[56] References Cited

U.S. PATENT DOCUMENTS

| | | | |
|---|---|---|---|
| 4,337,462 | 6/1982 | Lemelson | 340/65 |
| 4,415,979 | 11/1983 | Hernandez | 340/65 |
| 4,636,775 | 1/1987 | Burgess et al. | 340/65 |
| 4,651,128 | 3/1987 | Kolb | 340/65 |
| 4,683,542 | 7/1987 | Taniguti | 340/683 |

OTHER PUBLICATIONS

Sales Literature for the Ungo Box Alarm System by Techne Electronics, Ltd., Nov. 2, 1978.

*Primary Examiner*—Donnie L. Crosland
*Attorney, Agent, or Firm*—Roberts and Quiogue

[57] ABSTRACT

A user-programmable sensor system for generating an alarm signal upon detection of an alarm event is disclosed. The system is particularly suited for use in vehicle security systems. The system employs a three axes accelerometer as a shock/motion detector, and the transducer outputs are summed and the composite signal filtered to provide several channels, each covering a specific frequency or frequency band. The outputs of the channels are digitized and processed by a microprocessor. An event is characterized by several signal parameters with an alarm event triggered by the simultaneous occurrence of several predetermined conditions, and not just one condition. The limit values for the signal parameters which are required to qualify a shock/motion event as an alarm event may be readily programmed by the user at any time or place. The system further includes a glass breakage transducer and analyzes higher frequency components of the transducer signal to sense a glass breakage event when predetermined signal parameters are exceeded and when energy from the shock detector correlates with the glass breakage signal. The correlation with several parameters substantially reduces false alarm signals resulting from ambient high frequency noises, such as caused by passing siren-sounding vehicles or low-flying jets or helicopters.

25 Claims, 9 Drawing Sheets

PROGRAMMABLE SENSOR APPARATUS

BACKGROUND OF THE INVENTION

The present invention relates to security systems for detecting intrusion into protected areas such as automobiles, and more particularly to sensor devices for detecting such intrusion events to an automobile such as motion, shock/vibration or glass breakage, wherein the sensitivity of the sensor device to motion and shock alarm events is conveniently programmable by the automobile operator.

Security systems for automobiles are in common use today for protecting against unauthorized entry into the vehicle and sounding an alarm in the event of detected intrusion events. The systems include trigger and sensor devices for monitoring the status of doors and other entry points such as the hood and trunk, and may include sensor devices for detecting motion or shock/vibrations to the vehicle and even sounds such as glass breakage. Thus, the sensor may be adapted to detect shock/vibration resulting from actions such as attempted forced entry, glass breakage, jacking or lifting of the vehicle, driving the vehicle, or the like.

A common problem affecting conventional security systems is that of false alarms set off by environmental conditions unrelated to an attempted intrusion into the vehicle. In all systems on the market today, the sensor devices employed with the system have either a fixed sensitivity level, i.e., the threshold motion or shock level resulting in a detected alarm condition is fixed, and may neither be adjusted by the system installer nor by the vehicle owner, or sensor devices wherein the sensitivity may be adjusted by the installer of the system but not, however, by the user. Typically these sensor devices employ self-resonating circuits which trigger an alarm when the resonating energy reaches a certain threshold level, which may be adjusted by the installer. The adjustment is typically by a screwdriver and made on a screw head on the sensor housing. Since the sensor is typically installed at a hidden location which may not even be known to the owner of the vehicle, the installer is generally the person who adjusts the sensitivity level of the sensor. This preset level is therefore not readily adjustable, except by returning the vehicle to the installer, and even then the change in sensitivity may not be correct for the particular conditions of the parking location of the vehicle. For example, the vehicle may be parked routinely in a multilevel parking structure, an environment in which a relatively high level of low frequency high amplitude vibrations and movement may be present. If the installer adjusts the sensor in a ground-level (stable) garage, the resultant sensitivity level may be too high, resulting in false alarms once the owner begins parking the vehicle in the multi-story parking structure, or on a street with heavy traffic that will cause both high level of vibrations and substantial displacement of air by passing large vehicles such as busses and trucks, thereby causing the parked car to sway, consequently causing false alarms. As a result, the owner may elect not to arm the system when parking in such a location. Yet, such intermittent parking locations may be the higher risk situations, so that if the owner decides not to arm the system in such locations due to the high false alarm occurrence, he faces much greater risk of unauthorized intrusion into his vehicle.

Conventional glass breakage detectors are also susceptible to high false alarm rates. Conventional glass detectors typically operate on the principle of tuning the detector to the glass breakage frequency in the range of 10-12 Khz, and generate an alarm condition when the total energy detected at that frequency exceeds some threshold which is set by the installer. Such detectors often generate alarm signals when a siren-sounding vehicle, such as an emergency vehicle, passes a parked vehicle employing such a conventional glass breakage detector, or whenever a jet or helicopter flies low over the vehicle when it is parked in the proximity of an active runway near an airport.

It is therefore an object of the present invention to provide an intrusion event sensor which may be quickly and conveniently programmed by the user to a desired alarm sensitivity level without any tools, knowledge of electronics, or the knowledge as to where the sensor is installed in the vehicle.

A further object of the invention is to provide a sensor which is far less susceptible to false alarms than conventional sensor devices.

SUMMARY OF THE INVENTION

A user-programmable sensor system is disclosed for detecting shock/vibration and motion of the vehicle, wherein the sensitivity of the sensor system is readily set (and reset) by the system user. In accordance with the invention, the system comprises a shock/vibration and motion transducer responsive to shock/vibration and motion disturbances and which generates an electrical transducer signal indicative of such shock/vibration and motion disturbances.

The system further includes means for processing the transducer signal to provide a preset plurality of electrical output signals, each indicative of the energy content of the transducer signal within a predetermined frequency range.

Means are provided for generating a program mode signal indicating that the sensor system is in a program mode. A memory is provided for storing data including signal and parameter limit values generated by the transducers and read by the microprocessor during the program mode. Such values include minimum thresholds, decaying rate of the initial threshold, change of amplitude over a specified time constant and separation of low and high frequency components of the signal.

The sensor system also includes a system controller responsive to the plurality of channel output signals and the program mode signal. The processor includes means responsive to the channel output signals for calculating predetermined parameter values indicative of parameters characterizing the channel output signals. Means are provided for comparing these calculated parameter values with the stored parameter values. The processor further comprises means responsive to the comparing means for generating an alarm output signal when the calculated signal parameter values indicate that the shock/vibration and motion event meets or exceeds a signal characteristic profile for an alarm event.

The processor further comprises means responsive to the program mode signal for placing the system in a program mode. The programming means is responsive to the parameters values calculated during the programming mode for storing in memory new parameter and frequency values in dependence on the calculated parameter values.

The sensor system further includes a glass breakage detector for declaring an alarm event. The detector includes an audio transducer for picking up sounds and noises within or outside the vehicle interior, and means for processing the transducer signal to attenuate low and mid-range audio frequencies. The higher frequency components of the transducer signal are analyzed by the system controller to calculate certain parameter values characterizing sound and frequency of glass breakage and impact on glass events. When the calculated parameter values for a particular noise event exceed certain preset values characterizing a profile of glass breakage, and when such an event is cross-correlated with shock-/vibration energy from the shock/motion transducer, an alarm event is declared.

The system further includes a jacking detector for declaring an alarm event signal when a predetermined number of vibration/shock events occur within a fixed time interval.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE DISCLOSURE

Figure 1:
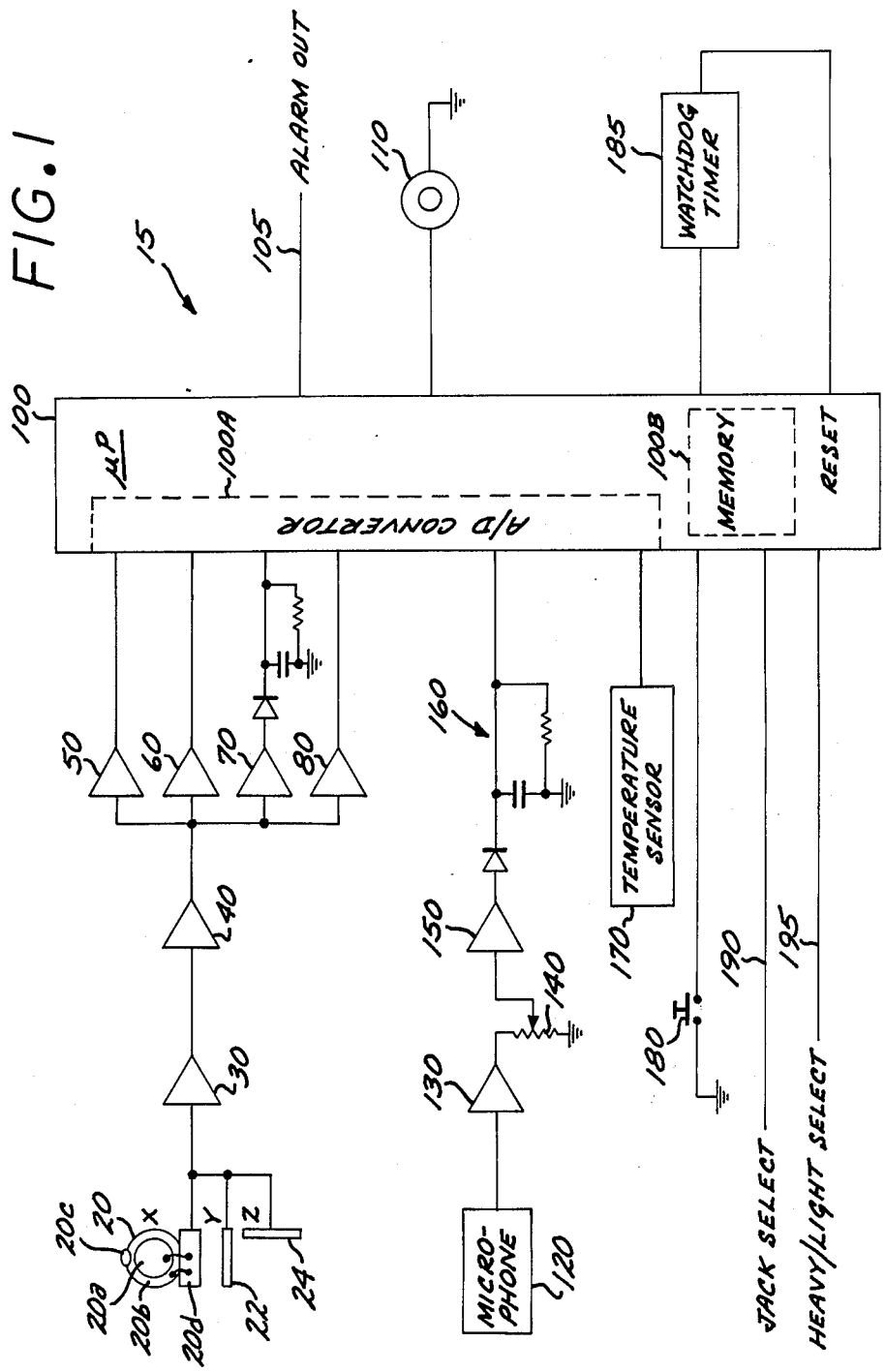
FIG. 1 is a schematic block diagram of a programmable sensor device embodying the invention.

The disclosed embodiment of the invention is a user programmable sensor system 15 designed to detect shock/vibration, motion and glass breakage. FIG. 1 shows a simplified schematic block diagram of the sensor system 15. The system 15 includes a shock/vibration and motion detector which comprises a three axis accelerometer. The accelerometer includes an X axis transducer 20, a Y axis transducer 22, and a Z axis transducer 24. In this embodiment, the X-axis transducer 20 comprises a piezoelectric electric element 20a mounted on a flexible metal substrate 20b, coupled to a mass 20c secured on one edge of the substrate 20b. The other edge of the substrate is secured to structure 20d. The Y and Z axis transducers comprise similar elements. Acceleration of the system in a given direction results in a change in the voltage across the corresponding transducer.

It is to be understood that, while a three-axes accelerometer is employed in the disclosed embodiment, the invention is not limited to systems employing three-axes devices. For certain applications two-axes or even single-axis devices may perform satisfactorily.

The outputs of the three transducers 20, 22 and 24 are equally summed by summing amplifier 30, and the resulting composite transducer signal is then amplified and integrated by amplifier 40, resulting in a signal at the output of the amplifier 40 which is proportional to the energy level of mechanical disturbances over a wide frequency bandwidth. This amplified transducer signal bandwidth is divided into four separate channels, each having unique gain and band width characteristics. Thus, the first two channels cover the very low bandwidth from 0.16 to 0.8 Hz, with the first channel having a higher gain and thereby representing lower amplitude signals within this frequency range, and the second channel having a lower gain than the first channel and representing higher amplitude signals in this bandwidth. The first channel signal is the output of filter 50, and the second channel signal is the output of filter 60.

The third channel is the output of the filter 70, and represents the energy content of signals having a frequency greater than 120 Hz. The third channel signal is the rectified output of the filter 70.

The fourth channel signal is the output of filter 80, and represents the energy content of signals having a frequency in the range between 10 and 100 Hz. As will be described below, the fourth channel signal is further filtered by digital signal processing to attenuate signal components having a frequency below 20 Hz. Thus, filters 50, 60 and 80 are bandpass filters, and filter 70 is a high pass filter.

The sensor system 15 further includes a glass breakage detector comprising a microphone 120 placed within the vehicle passenger compartment to pick up various sound vibrations due to tapping on or attempted breakage of any of the vehicle's glass. The resulting electrical signal from the microphone 120 is amplified by amplifier 130, filtered by filter 150, and envelope detected by rectifier 160. The filter 150 attenuates frequencies below 10 KHz and passes signals above 10 KHz which corresponds to the signals created by the sound of glass excitation or breakage. The resultant envelope detected signal is the output signal of the glass breakage detector.

The system 15 further comprises a microprocessor 100 which functions as the system processor. The microprocessor 100 includes an on-board analog-to-digital converter ("ADC") for sampling the four analog channel output signals of the shock/vibration/motion detector and the analog output of the glass breakage detector and converting the sampled values into respective digital values. The microprocessor 100 is programmed to process the digitized signals from the transducers to determine whether to declare an alarm event.

In this embodiment, in order for a shock/vibration/motion event to qualify as an alarm event, the composite signal from the accelerometer is characterized by occurrence of several conditions. The third channel signal (the rectified output from the filter 70) must rise (in voltage) to a predetermined limit value within a given time, its peak voltage must also exceed a predetermined limit value, and there must be a predetermined minimum energy transferred through the 0.1–0.8 Hz filter (the first and second channels). If all three conditions are met, an alarm event will be triggered. Alternatively, an alarm event will be declared if the rise in voltage of the third channel signal within the given time exceeds the threshold and the peak voltage of the same signal exceeds the predetermined limit value by a factor of two.

In order for a glass breakage event to be qualified as an alarm event, there are four signal characteristics measured against programmable limits in this embodiment. The predetermined limits are for the rectified, filtered signal rise time, the peak voltage, the time of the peak voltage relative to the beginning of an event, and the time duration of the signal, cross-correlated against the shock/vibration/motion energy detected through the filter 80. If the event meets these predetermined conditions, an alarm event is detected.

The system 15 further comprises an "alarm out" terminal 105 of the microprocessor 100 which is activated when an alarm event is declared. The "alarm out" signal may be employed to activate a security system siren, for example. A preferred application of the sensor system 15 is in a vehicle security system as a replacement for the conventional vibration sensor and glass breakage sensor devices activated simply when the threshold of either voltage or frequency is detected.

A switch 180 is provided to place the sensor system in the program mode for programming the shock/vibration/motion threshold levels. The switch may be a manually-operated device, or one controlled by another element, such as a security system electronic control unit. A piezoelectric buzzer 110 is provided to provide audio signals generated during the programming mode as will be discussed in further detail regarding the programming of the system.

Figure 2:
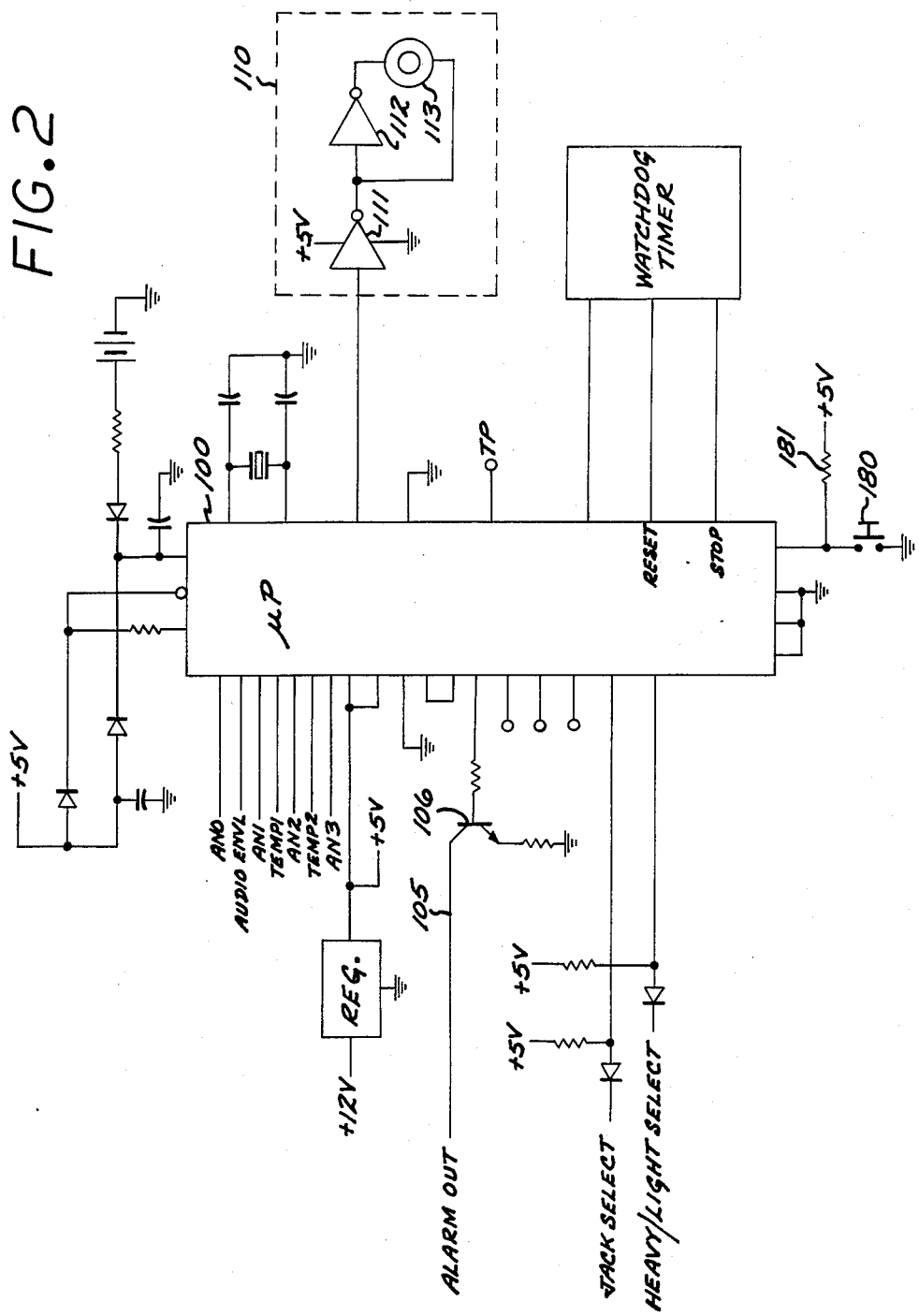
FIGS. 2–4, 5A and 5B are schematic diagrams further illustrating specific elements comprising the embodiment of FIG. 1.

The elements comprising the system of FIG. 1 are shown in further detail in FIGS. 2-5. Referring now to FIG. 2, the microprocessor 100 and its peripheral connections are shown in further detail. As noted, a device 100 is employed in this embodiment which includes an on-board ADC indicated as A/D converter 100A; alternatively an ADC chip separate from the microprocessor device 100 could be employed to perform the ADC function. The analog signals to be converted into digital values are received at terminals AN0-AN5 of the microprocessor. Each of these signals will be described in further detail below.

The microprocessor 100 further comprises an on-board non-volatile memory 100B for storing data such as the signal parameters. Here again, a separate memory chip can alternatively be employed to store information required during the operation of the system 15.

A crystal oscillator circuit 101 provides a clock frequency of about 12 MHz for the microprocessor 100. 5 and 12 volt supply voltages are provided to the microprocessor 100. A watchdog timer circuit 185 provides stop and reset signals to the system, as is well known to those skilled in the vehicle security system art.

The system 15 further comprises a means for selectively providing a detection function for detecting unauthorized jacking or lifting of the vehicle. The selection is performed by the state of the "jack select" terminal of the microprocessor 100. If the terminal is grounded the function is enabled. Further selectivity is provided by selecting the "heavy" or "light" terminal connection, depending on whether the vehicle in which the system is installed is a relatively heavy or light vehicle. A heavy vehicle produces lower frequency vibrations when subjected to shock or lifting than a light vehicle. The microprocessor 100 has stored in software the signal parameters for the jack option, i.e., for determining whether the vehicle is being jacked up. Different parameters are selected depending on whether the vehicle is a heavy or light vehicle.

Terminal PA0 of the microprocessor 100 is pulled up to the 5 volt supply through a resistor. The program switch 180 selectively pulls the terminal PA0 to ground to signal that the program mode of the sensor system has been activated.

In the event an alarm condition is detected, an "ALARM OUT" signal is generated on line 105. Terminal PB6 is brought to the active state to turn on drive transistor 106. The ALARM OUT signal may be used to activate an entire security system or just an alarm warning device such as a siren.

Figure 3:
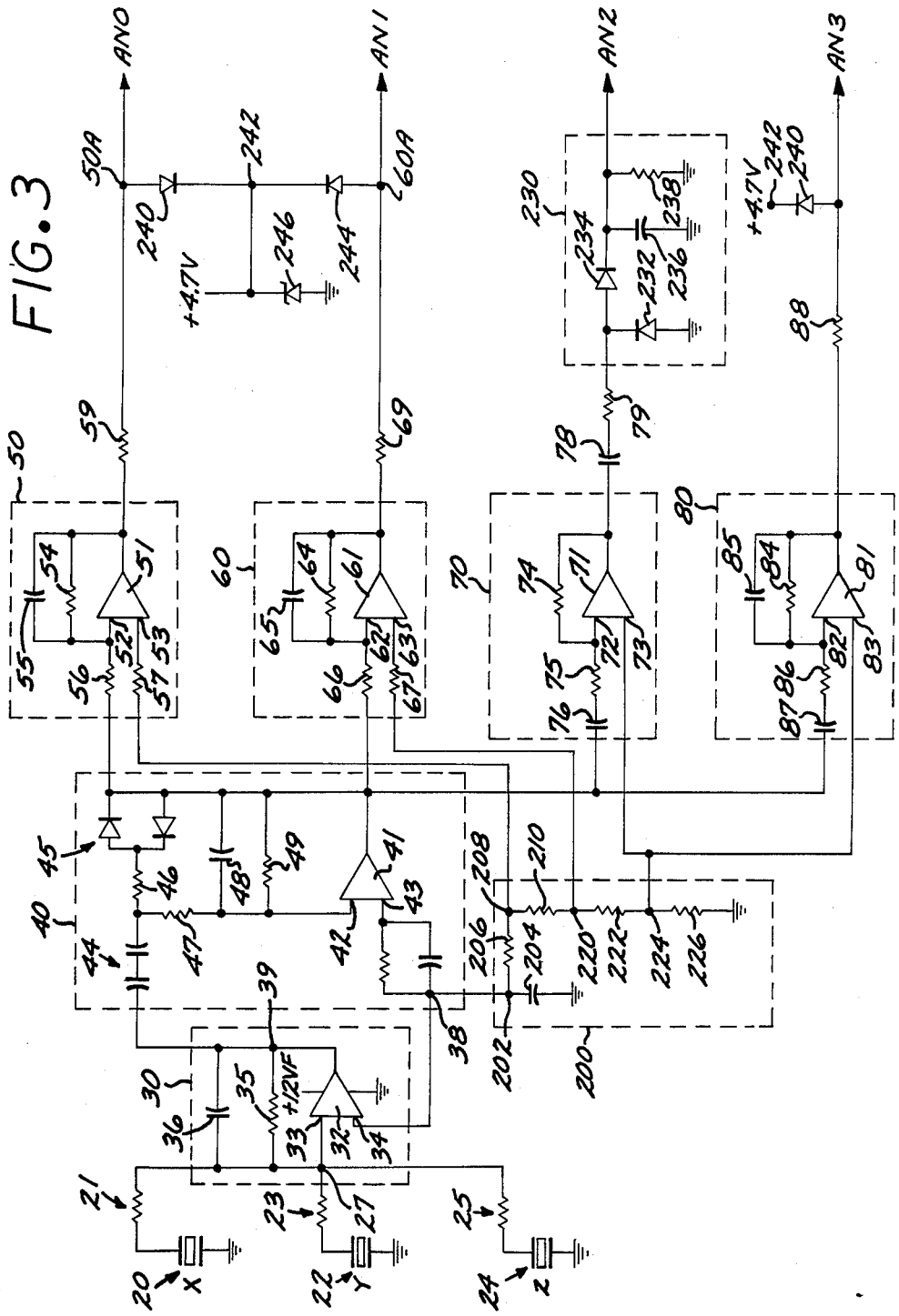

FIG. 3 illustrates the shock/vibration/motion detector in further detail. The piezoelectric transducers 20, 22 and 24 are each coupled to a common summing node 27 of the summing amplifier 30 through 10 Mohm resistors 21, 23 and 25. The summing node 27 is in turn connected to the inverting input of operational amplifier 32 comprising the summing amplifier 30. In this embodiment amplifier 32 is a type LF353 device. The non-inverting input of amplifier 30 is coupled to node 202 at the 5 volt supply level of voltage divider network 200. Feedback resistor (10 Mohm) 35 and 0.001 farad capacitor 36 are connected between the output of the amplifier 32 and input 33. The summing amplifier 30 functions to provide a voltage level which is proportional to the sum of the output signals from each of the transducers 20, 22 and 24.

The output of the summing amplifier 30 at node 39 is coupled to the input of the amplifier 40. Capacitors 44 couple node 39 through 100K ohm resistor 47 to the inverting input 42 of operational amplifier 41, also a type F353 device. Feedback between the output and the inverting input 42 of the amplifier 41 is provided by 10 Mohm resistor 49 and 0.001 farad capacitor 48. Additional feedback is provided by diode pair 45 and 100K ohm resistor 46. The amplifier 40 in this embodiment provides a gain of about 100. The output of the amplifier 40 is coupled to the inputs of each of the filters 50, 60, 70 and 80.

Filter 50 comprises operational amplifier 51, with an inverting input 52 coupled to the output of amplifier 40 through resistor 56. The amplifier 51 in this embodiment comprises a type LS324 device. The non-inverting input 58 is coupled to node 208 of voltage divider network 200 through 20K ohm resistor 57. Node 208 is at a voltage of 4.950 volts. Feedback around the amplifier 51 is provided by resistor 54 and capacitor 55. The output of filter 50 is coupled through resistor 59 to provide the AN0 analog signal. The sizes of the resistor 54, 56 and 57 and the capacitor 55 are selected so that the filter 50 has a narrow passband of 0.16 to 0.8 Hz and a gain of 5000. The output of filter 50 is coupled through 10K ohm resistor 59 to node 50A to provide the analog signal AN0.

Filter 60 is constructed of generally similar elements to those described above regarding filter 50, except that the non-inverted input 63 of operational amplifier 61 is coupled to node 220 of divider network 200, which node is at a reference voltage of 4.795 volts. The values of resistors 66, 67 and 64, and the capacitance of capacitor 65 are selected so that the filter 60 has a passband of 0.16 to 8 Hz but with one quarter the gain, 1250, of that of filter 50.

The output of filter 60 is coupled through 10K ohm resistor 69 to comprise analog signal AN1 at node 60A. Nodes 50A and 60A are coupled together by diodes 240 and 242, whose anodes are connected at node 242. The voltage level at node 242 is limited to 4.74 volts by zener diode 246. This circuit arrangement operates to provide a two-scale measurement of the energy content of the signal within the 0.1 to 8 Hz passband. When signal AN0, the output of the higher gain filter 50, saturates at the Zener breakdown voltage, the signal AN1 then provides a signal level indicative of the energy level through this frequency range (0.1 to 0.8 Hz) at a coarser scale since the gain through this filter 60 is lower than that of the filter 50.

The signals AN0 and AN1 are digitized by the ADC comprising the microprocessor 100. Assume, for the sake of example, that the ADC provides 8 bit resolution, i.e., with a maximum value of 256. The microprocessor is programmed to read the value of AND as the value for the frequency channel covering 0.1 to 0.8 Hz until the value reaches some predetermined saturation value, e.g., 200. At that point, the microprocessor automatically switches to signal AN1 to determine the value for this frequency channel. Because the gain of the amplifier 60 is only a quarter of the gain of amplifier 50, the microprocessor 100 is programmed to calibrate the digitized value of signal AN1 to the same scale as that of signal AN0 by multiplying the digitized AN1 value by a factor of four. Thus, this two scale determination of the energy through the 0.1 to 0.8 Hz frequency band provides relatively wide dynamic range of operation.

Filter 70 comprises operational amplifier 71, also a type LS324 device. The output of amplifier 40 is coupled to the inverting input 72 of amplifier 71 through farad capacitor 76 and resistor 75. The non-inverting input 73 is connected to node 224 of the voltage divider network 200, which node is at 2.54 volts. Feedback across the amplifier 71 is provided by resistor 74. The values of capacitor 76, resistor 75 and resistor 74 are selected so that filter 70 is a high pass filter with a cutoff frequency of 120 Hz.

The output of filter 70 is coupled through capacitor 78 and 33K ohm resistor 79 to rectifier circuit 230. This type of circuit is well known to those skilled in the art, and comprises diodes 232 and 234, capacitor 236 and 330 K ohm resistor 238. The output of the rectifier 230 comprises the analog signal AN2.

Filter 80 comprises operational amplifier 81, also a type LS324 device. The output of amplifier 40 is coupled through capacitor 87 and resistor 86 to the inverting input 82 of amplifier 81. The non-inverting input 83 of amplifier 81 is connected to node 224 (at 2.54 volts) of the voltage divider network 200. Feedback around the amplifier 81 is provided by resistor 84 and capacitor 85. The values of the capacitors 85 and 87, and of the resistors 84 and 86, are selected so that the filter 80 has a passband from 10 to 100 Hz.

The output of filter 80 is coupled through 10K ohm resistor 88 to node 80A to provide the analog signal AN3. A diode 240 is coupled anode to cathode between nodes 80A and 242, the latter node being connected to a reference voltage of 4.7 volts, to limit the signal level of AN3 to 4.7 volts.

The microprocessor 100 is programmed to provide signal processing of the signal AN3 to attenuate signals having a frequency below 20 Hz. Such software filtering is well known to those skilled in the art. The technique includes subtracting the digitized DC component of the transducer signal from the digitized form of AN3. The signals AN0-AN1 are sampled by the ADC 100A at a 100 Hz rate, and the integrated value of the very low pass filter 50 over a relatively long period (e.g., 30 seconds) provides the estimated DC component. At the sampling rate of 100 Hz for AN3, frequency components below 20 Hz are substantially attenuated. The resultant value, i.e., AN3 less the DC component, then effectively contains only frequency components from 20 Hz to the upper cutoff frequency of filter 8, 100 Hz. Thus, the microprocessor 100 actually uses frequency components of signal AN3 in the range of 20 to 100 Hz.

Figure 4:
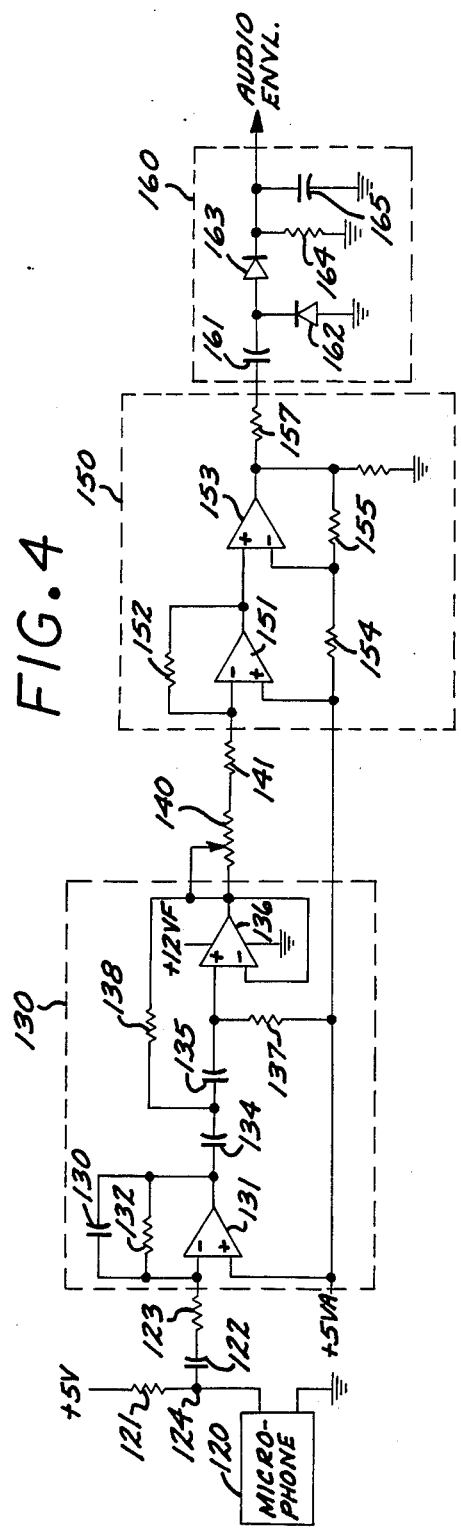

FIG. 4 illustrates in greater detail the glass breakage detector of the system. The microphone 120 acts as a transducer to convert incident acoustic energy into electrical voltages developed between the terminals of the device. One terminal of the microphone is connected to ground, the other to node 124. 10K ohm resistor 121 couples the node 124 to a 5 volt supply level. The microphone output at node 124 is coupled through 0.001 farad capacitor 122 and 10K ohm resistor 123 to the input of filter 130.

Filter 130 is a high pass filter adapted to attenuate frequency components below 10 Khz, and to pass higher frequency components up to the high frequency cutoff of the microphone 120. Filter 130 comprises operational amplifiers 131 and 136, each a type LS324 device. The inverting input of amplifier 131 receives the input signal to the filter 130. The non-inverting input of amplifier 131 is connected to the 5 volt supply level. Feedback across amplifier 131 is provided by 200K ohm resistor 132 and 10 picofarad capacitor 133. The output of amplifier 131 is coupled through capacitors 134 and 135 to the non-inverting input of amplifier 136, which is also coupled to the 5 volt supply level through 33K ohm biasing resistor 137. Feedback across the non-inverting input of amplifier 136 and capacitor 135 is provided by 16K ohm resistor 138.

Commercially available microphones such as are used for microphone 120 tend to have widely varying gains from unit to unit. Variable resistor 140 provides a factory adjustment for adjusting for the gain of the microphone so that each glass breakage detector provides substantially the same AN3 signal level. Thus, the output of the filter 130 is passed through (10K ohm) variable resistance 140 and 2K ohm resistor 141 to the amplifier circuit 150.

The amplifier circuit 150 comprises operational amplifiers 151 and 153 of the LS324 type, and provides amplification of the filtered signal from the microphone 120. The non-inverting input of amplifier 151 is connected to the 5 volt supply level, and the inverting input of amplifier 153 is coupled to the supply level through 5.1K ohm resistor 154. Feedback of amplifier 151 is provided by 22K ohm resistor 152. Feedback of amplifier 153 is provided by resistor 155. The output of amplifier 153 is biased to ground by 4.7K ohm resistor 156. The amplifier output is passed through 10K ohm resistor 157 to rectifier circuit 160. The latter circuit comprises capacitor 161, diodes 162 and 163, resistor 164 and capacitor 165. The circuit 160 functions to envelope detect the filtered audio signal from the microphone 120, providing the analog signal AUDIO ENVL.

The microprocessor 100 also receives additional analog transducer signals in the form of the TEMP1 and TEMP2 signals from the temperature sensor 170, shown in further detail in FIG. 5. The sensor 170 comprises resistor 171, diodes 172-175 and resistor 176 which are connected in series between the 5 volt supply and ground. The voltage drop across each diode junction is temperature dependent. Thus, as the temperature changes, the difference in voltage levels between the TEMP1 and TEMP2 signals will also change. Temperature compensation of the AUDIO ENVL signal by the microprocessor 100 can therefore be accomplished. Such compensation is necessary due to the wide variation in the microphone gain as a function of temperature and microphone aging. At high and low temperature extremes, the microphone gain performance is unpredictable, and the gain may be much greater than when the temperature is at mid-range value.

Figure 5B:
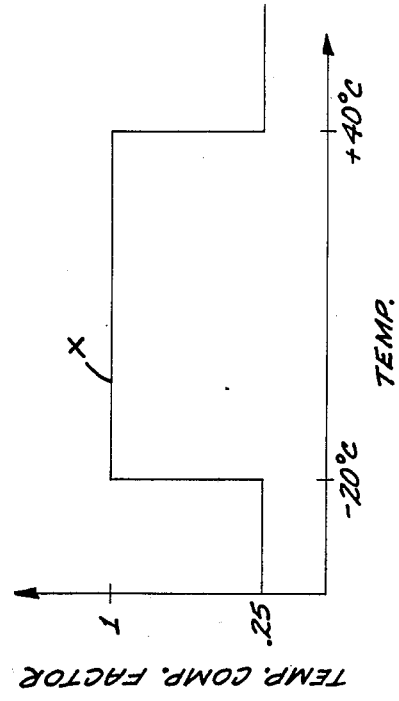
Figure 5A:
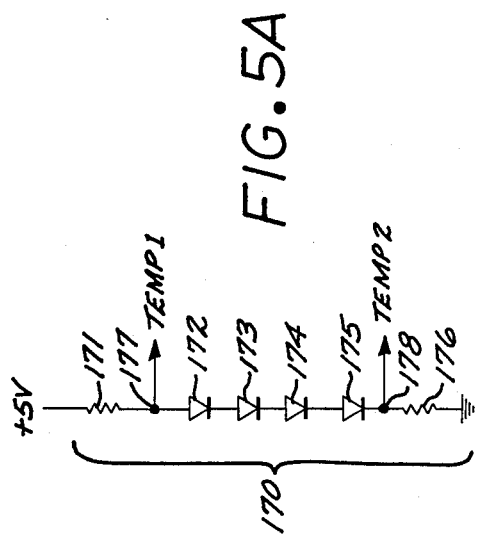

The microprocessor 100 is programmed to monitor the digitized value of the temperature sensor signals TEMP1 and TEMP2, and to calculate the difference between the values of the two signals. The voltage drop across a diode junction as a function of temperature is a published parameter for a given type of diode. Therefore, the difference between the value of TEMP1 and TEMP2 provides the relative voltage drop across four diode junctions, i.e., across diodes 172-175. Using the published parameter data for the type of diode, e.g., a type IN914 diode, the approximate temperature can be extrapolated. The microprocessor is programmed to compensate for high and low temperature conditions (which may likely result in increased microphone gain). One simple compensation technique is to divide the digitized value of the glass breakage detector signal AUDIO ENVL by a factor of four. In this embodiment the high and low temperature break points are $+40°$ C. and $-20°$ C. Thus, for this simple technique, the temperature compensation factor "X" which multiplies the value of AUDIO ENVL is unity when the sensed temperature is between $-20°$ C. and $+40°$ C., and is $\frac{1}{4}$ when the temperature is outside this range. This variation in the temperature compensation factor is shown in FIG. 5B. A preferred compensation technique is to average the AUDIO ENVL signal over an increased number of samples when the temperature is detected as being at an extreme. Such averaging compensates for the unpredictable microphone gain at extreme temperatures.

Having described the hardware comprising the sensor system as shown in FIGS. 1-5, additional functions performed by the microprocessor will be described in greater detail. The analog transducer signals AN0-AN3, TEMP1 and TEMP2 are periodically sampled at a 100 Hz sample rate and the sampled values converted to digital values by the ADC 100A on board the microprocessor 100. The corresponding digital values are processed by the microprocessor 100 to detect alarm conditions.

Figure 7:
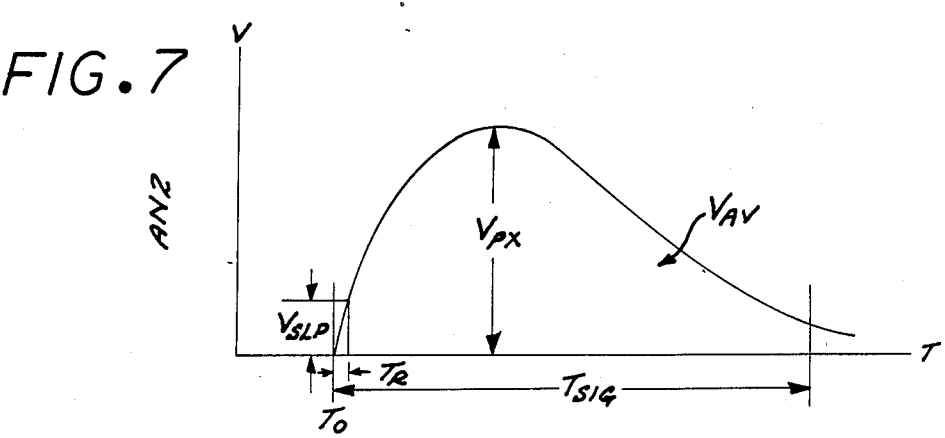
FIGS. 7–9 are exemplary waveforms of three filtered signals processed by the sensor device of FIG. 1.
Figure 8:
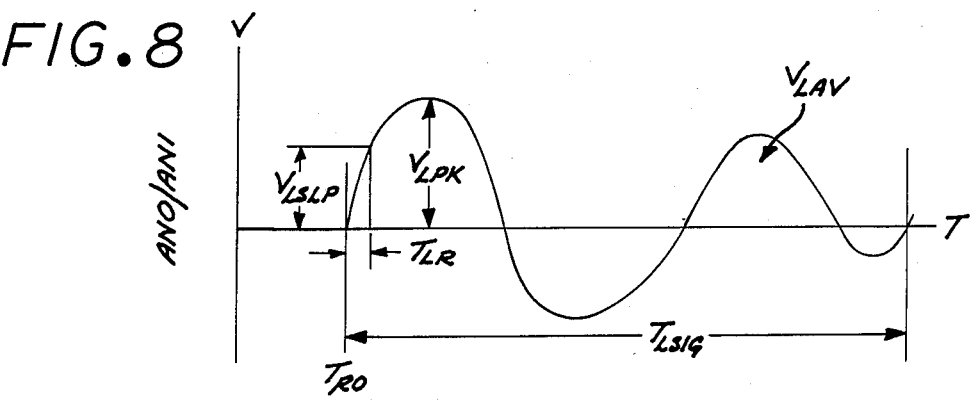
Figure 9:
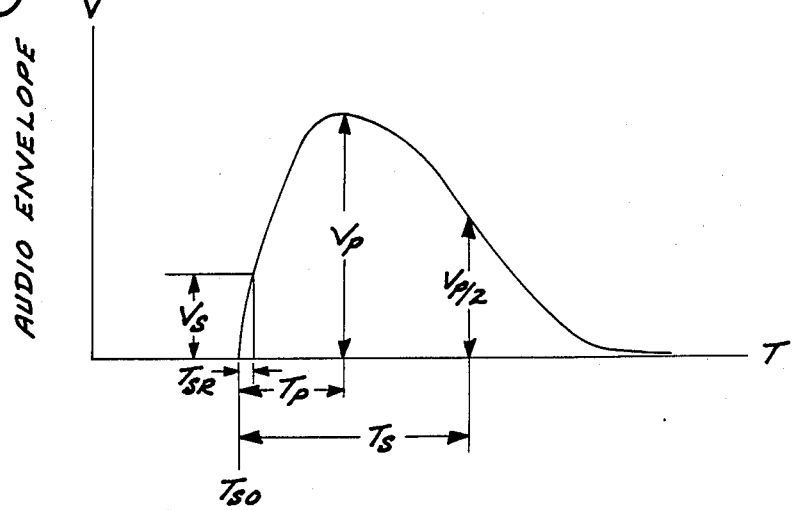

Referring now to FIGS. 7-9, exemplary waveforms illustrative of the AN2, AN0/AN1 and the AUDIO ENVL, event signals are shown. FIG. 7 illustrates the high frequency channel signal AN2. FIG. 8 illustrates the low frequency channel signals AN0 and AN1. FIG. 9 illustrates the detected audio envelope signal AUDIO ENVL. Each of these figures shows a signal of some event such as may be typical of an alarm event. Each signal is characterized by several parameters that are calculated by the microprocessor 100 from the digital data representing these transducer data signals. Thus, the signal AN2 (FIG. 7) is characterized by a voltage magnitude $V_{slp}$ for a given voltage rise time interval $T_{rp}$ which commences after a rise in the voltage level above a zero level is detected. The signal AN2 is further characterized by the peak voltage level $V_{pk}$ and the average voltage level $V_{av}$ over the time interval $T_{sig}$ commencing at $T_o$ and having a predetermined duration, in this embodiment of 320 milliseconds.

The waveform (FIG. 8) for the combined signals AN0/AN1 is characterized by similar parameters. The voltage rise magnitude $V_{lslp}$ is the voltage rise from the zero level at time $T_{ro}$ over a predetermined rise time interval $T_{lr}$. The peak voltage level is $V_{lpk}$, and $V_{lav}$ is the absolute unrectified average voltage for the time $T_{lsig}$ between the $T_{ro}$ and the third subsequent zero crossing.

The waveform (FIG. 9) for the signal AUDIO ENVL is characterized by similar parameters. Thus, the voltage rise magnitude $V_s$ is the voltage rise from the zero level at time $T_{so}$ to the expiration of the predetermined time interval $T_{sr}$. The peak volage is $V_p$. The time interval $T_s$ is measured from $T_{so}$ to the time at which the magnitude signal AUDIO ENVL has decayed to $V_p/2$.

These parameters are summarized as follows where $K_1$-$K_{11}$ represent empirically predetermined constants:

| Signal AN2 | | |
|---|---|---|
| $T_{sig} =$ | 320 milliseconds | |
| $T_r =$ | 10 milliseconds (one sample period) | |
| | (Min) | (Max) |
| $V_{pk} =$ | $K_1$ | Programmed |
| $V_{av} =$ | $K_2$ | Programmed |
| $V_{slp} =$ | $K_3$ | Programmed |
| Signals AN0/AN1 | | |
| $T_{lsig} =$ | 640 milliseconds | |
| $T_{LR} =$ | 10 milliseconds (one sample period) | |
| | (Min) | (Max) |
| $V_{lpk} =$ | $K_4$ | Programmed |
| $V_{lav} =$ | $K_5$ | Programmed |
| $V_{lslp} =$ | $K_6$ | Programmed |
| Signal AUDIO ENVL | | |
| $T_{sr} =$ | 1 millisecond (one sample period) | |
| $V_s =$ | $K_7$ minimum | |
| $V_p =$ | $K_8$ minimum | |
| $T_p =$ | 35 msec maximum for $V_p > K_9$ | |
| $=$ | 20 msec maximum for $V_p < K_9$ | |
| $T_s =$ | 100 msec maximum for $V_p > K_{10}$ | |
| $=$ | 25 msec maximum for $K_{11} < V_p < K_{10}$ | |
| $Q =$ | $V_p/T_s = 1$ minimum for $V_p > K_{10}$ | |

The foregoing "min" or minimum values indicated for certain of the signal parameters are predetermined minimum values for these parameters; the values can be raised during the programming mode, but in this embodiment cannot be lowered below the minimum values, which also provide default values employed until higher values are established in the programming mode. As a result, the sensor 15 has a predetermined maximum sensitivity to detecting shock/vibration/motion alarm events.

The minimum limit values $K_1$-$K_6$ for the shock/vibration transducer signal are selected to be sufficiently above the internal noise threshold of the system, i.e., the quiescent noise level, in order that the system will not trigger spontaneously due to internal noise levels. The particular values are dependent on the particular system hardware and software implementation for a given application. These values establish a sensitivity level which is quite high; typically the system will be operated with higher programmed limit values established during the program mode thereby reducing the sensitivity.

The minimum limit values $K_7$-$K_{11}$ are also dependent on the particular hardware and software implementation, and for this embodiment were selected based on empirical testing. In this embodiment, the value for the constant $K_{11}$ is a relatively small value at or near the minimum limit value for $V_p$ (say about 1/20 of $K_9$), and the value for $K_{10}$ is intermediate the values for $K_9$ $_{nd}$ $K_{11}$ (say 1/5 $K_9$). Preferably, the predetermined parameters result in generation of an alarm event caused by striking the glass which does not result in actual glass breakage. Using a value for $V_s$ which is 83% of the level selected for $V_p$ has been found satisfactory. The actual values selected will also typical be well above the internal noise levels of the system.

It is noted that the signals $V_{slp}$, $V_{lslp}$ and $V_s$ are measured from one ADC sample to the next, i.e., over one sample period. For the shock/vibration detector signals AN0–AN3, the sample period is 10 milliseconds; the corresponding sample period for the signal AUDIO ENVL is 1 millisecond.

The microprocessor 100 is programmed so that an alarm condition will not be declared unless certain of the signal parameters have been met or exceeded. Calculation of the various peak voltages, average voltages and time interval by the microprocessor 100 takes place only after one or more of the respective voltage rise magnitudes have met or exceeded either a predetermined minimum limit value or a programmed limit value.

In order for a shock/vibration/motion event to be qualified by the microprocessor 100 as an alarm event, one of the following two conditions must be met:

Condition 1: For signal AN2 (a) $V_{slp}$ exceeds the greater of (i) the programmed maximum value or (ii) the minimum value, and (b $V_{pk}$ exceeds twice the greater of (i) the programmed value or (ii) the minimum value;

Condition 2: For signal AN2: (a) $V_{slp}$ exceeds the greater of (i) the programmed maximum value or (ii) the minimum value; (b) $V_{pk}$ exceeds the greater of (i) the programmed value of (ii) the minimum value; and (c) $V_{av}$ exceeds the greater of (i) the programmed value or (ii) the minimum value;

For signal AN0/AN1: (a) $V_{lslp}$ exceeds the greater of the (i) programmed value or (ii) the minimum value; and (b) $V_{lav}$ exceeds the greater of the (i) the programmed value or (ii) the minimum value; and where the time interval between the signal AN2 event and the signals AN0/AN1 event is less than or equal to one second.

The conditions for declaring a glass breakage event are the following:

(a) The $V_s$, $V_p$, $T_p$, $T_s$ and Q parameters all exceed the specified thresholds; and (b) the signal AN3 magnitude is greater than or equal to a predetermined threshold constant $K_{12}$ within 100 msec of condition (a) becoming true.

Thus, the glass breakage detector operates by comparing the value of the detected peak value corresponding to $V_P$ against the parameters $K_9$–$K_{11}$ to determine the appropriate values for the time interval durations $T_s$ and $T_p$. If the peak value $V_p$ does not occur within the specified time duration $T_p$, it will be disregarded for purposes of triggering a glass breakage event. Similarly, if the signal level of the AN3 signal does not fall to $V_{p/2}$ within the time interval $T_s$, the event will be disregarded for purposes of triggering a glass breakage event.

It has been determined empirically that in order for vehicle glass breakage to occur, sufficient impact against the glass is exerted so that shock energy in the 20 Hz to 100 Hz frequency range will be transmitted to the accelerometer so that the magnitude of AN3 exceeds a specified threshold value $K_{12}$ within 100 milliseconds of the trigger from the signal AUDIO ENVL. By requiring this cross-correlation of vibration energy with the trigger from the glass breakage transducer in order to declare a glass breakage event, false alarms due to ambient high audio frequency noises (such as from sirens, jet engines and the like) are avoided.

The system is placed in the programming mode by actuation of the programming switch 180. It is to be understood that the circuit elements shown in FIG. 1, except (in some applications) for the switch 180 and the piezoelectric beeper 110, are adapted to be housed in a device housing which may be placed in the vehicle by the system installer at a location which is hidden from view and which need not be readily accessible by the system user. The switch 180 may be installed at a location which is readily accessible by the system user, e.g., on the vehicle dashboard or in the vehicle glove compartment. Alternatively, the switch 180 may be an electronic element such as a switching transistor which is controlled by another device such as a security system controller. The beeper 110 may be located adjacent the switch 180, or with the other elements of the system 15, so long as the user can hear the sounds generated by the beeper when programming the system.

Once placed in the programming mode, the system is responsive to shock and vibration forces exerted on the vehicle by the user to program the parameter values described above. Thus, the user exerts a shock against the vehicle by striking it anywhere with the hand, or by kicking a tire or bumper to exert the magnitude of shock desired to trigger the sensor when in its operational mode. If the user wishes the sensitivity of the sensor to be relatively low, then a substantially greater force is exerted by the user than if a high sensitivity is desired. Because the microprocessor is programmed with minimum limit values of the parameters, the sensitivity of the glass breakage detector in this embodiment cannot be higher than the sensitivity dictated by these minimum parameter values.

Figure 6:
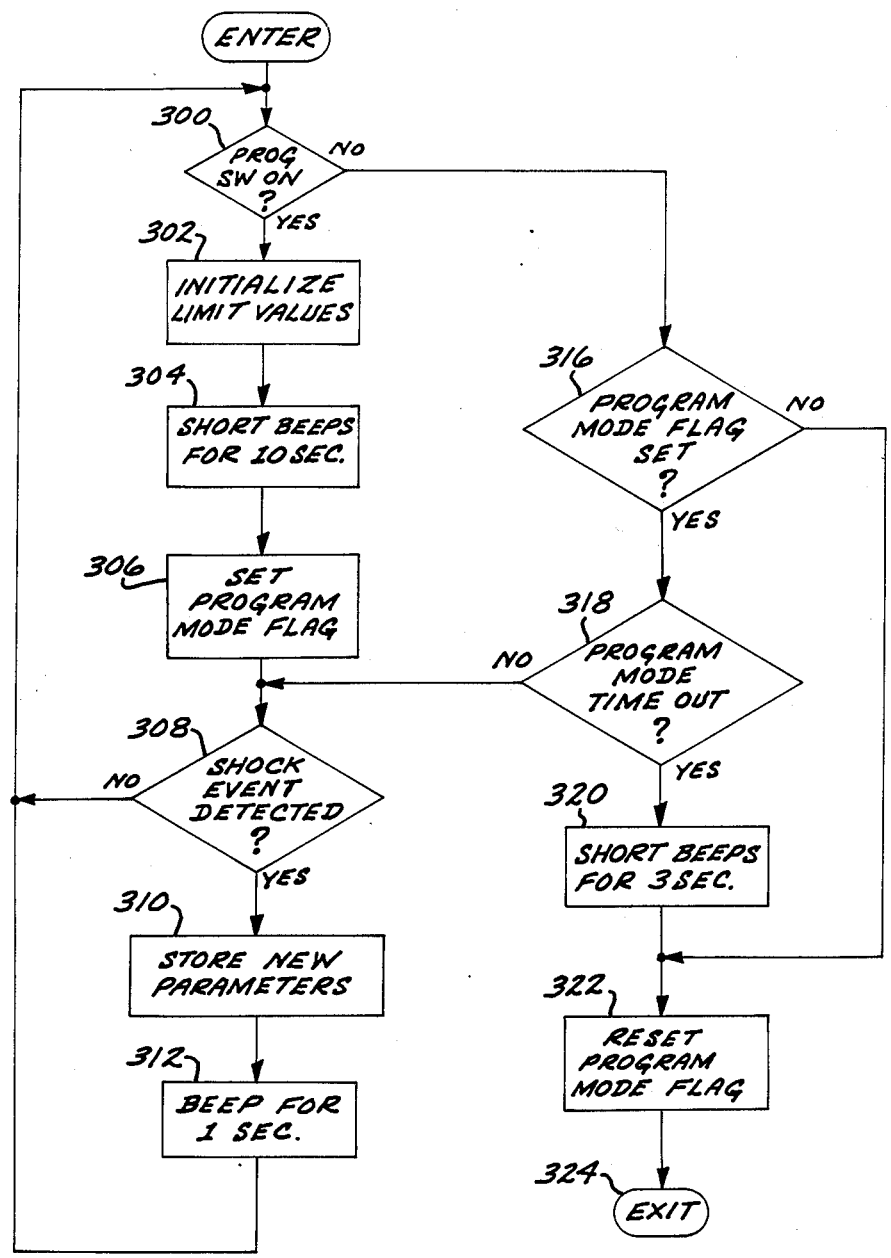
FIG. 6 is a simplified flow diagram illustrating the programming mode of the sensor device of FIG. 1.

Referring now to FIG. 6, a simplified flow diagram is shown which illustrates the operation of the system during the programming mode. Step 300 is a test point for determining the status of the programming switch 180. If the switch is actuated or "on," then the parameter limit values stored in memory are reset to the predetermined minimum limit values (step 302) and the piezoelectric beeper is activated to sound short beeps for 10 seconds to signify to the user that the programming mode has been entered (step 304). The programming mode flag is set at step 306. At step 308 a decision is made as to whether or not a shock event has been detected. This decision is made by examining the shock detector signals AN0–AN3, and in particular whether the minimum limit values for signals AN0–AN2 have been exceeded. If no shock event has been deteeted, then operation returns to step 302. If a shock event has been detected, then at step 310 the new parameters measured during the shock event are stored in the resident nonvolatile memory of the microprocessor 100. At step 312 the beeper is activated for one second to signify to the user that the new parameters have been stored, and operation returns to step 302.

If the programming switch was not "on" at step 302, then at step 316, the program mode flag is checked, and if the flag is not set, the program mode is exited (step 324). Otherwise, if the flag is set, then at step 318 the program mode timer is checked to determine whether the predetermined program timer has elapsed since the program switch was actuated. (In this embodiment, the program mode timer duration is 20 seconds.) If the time has not elapsed, the operation branches to step 308. Otherwise, the beeper is sounded for three seconds to signify to the user that the program mode is being exited, at step 322 the program mode flag is set to zero, and the program mode is automatically exited (324). If the system user wishes to return the sensitivity of the system to shock/vibration events, to the factory preset levels established by the minimum parameter, the user need only configure the system in the program mode, applying no shock or vibration-inducing forces to the vehicle during the time in which the system is configured in the program mode. Operation then returns to the normal operation of the system.

It will be appreciated that the program mode routine of FIG. 6 is periodically and frequently entered during the normal operation of the system. If the switch 180 is not activated, the routine is immediately exited.

The sensor system 10 further comprises means for detecting the jacking or lifting of the vehicle. The microprocessor 100 employs data from the accelerometer for this purpose, and in particular the mid-range channel signal AN3. If the "heavy" vehicle selection is made on line 195, then the microprocessor 100 analyzes the AN3 signal without further software filtering (to attenuate signal components below 20 Hz). If the light car selection is made, the software filtering discussed above is employed to remove the signal components between 10 to 20 Hz. The heavier cars will generate lower frequency vibrations than will the lighter cars, and this is the reasons for the selective attenuation of the 10–20 Hz components.

The microprocessor 100 has stored in memory limit parameters for both the heavy and light car situation. Jacking of the car is determined, and an alarm event declared, if three "jerks are detected within three seconds. A "jerk" is defined as occurrence of a peak signal for AN3 which exceeds a predetermined constant $K_{13}$. Thus, evaluation of the signal AN3 for the jacking event occurs on an ongoing basis.

Figure 10A:
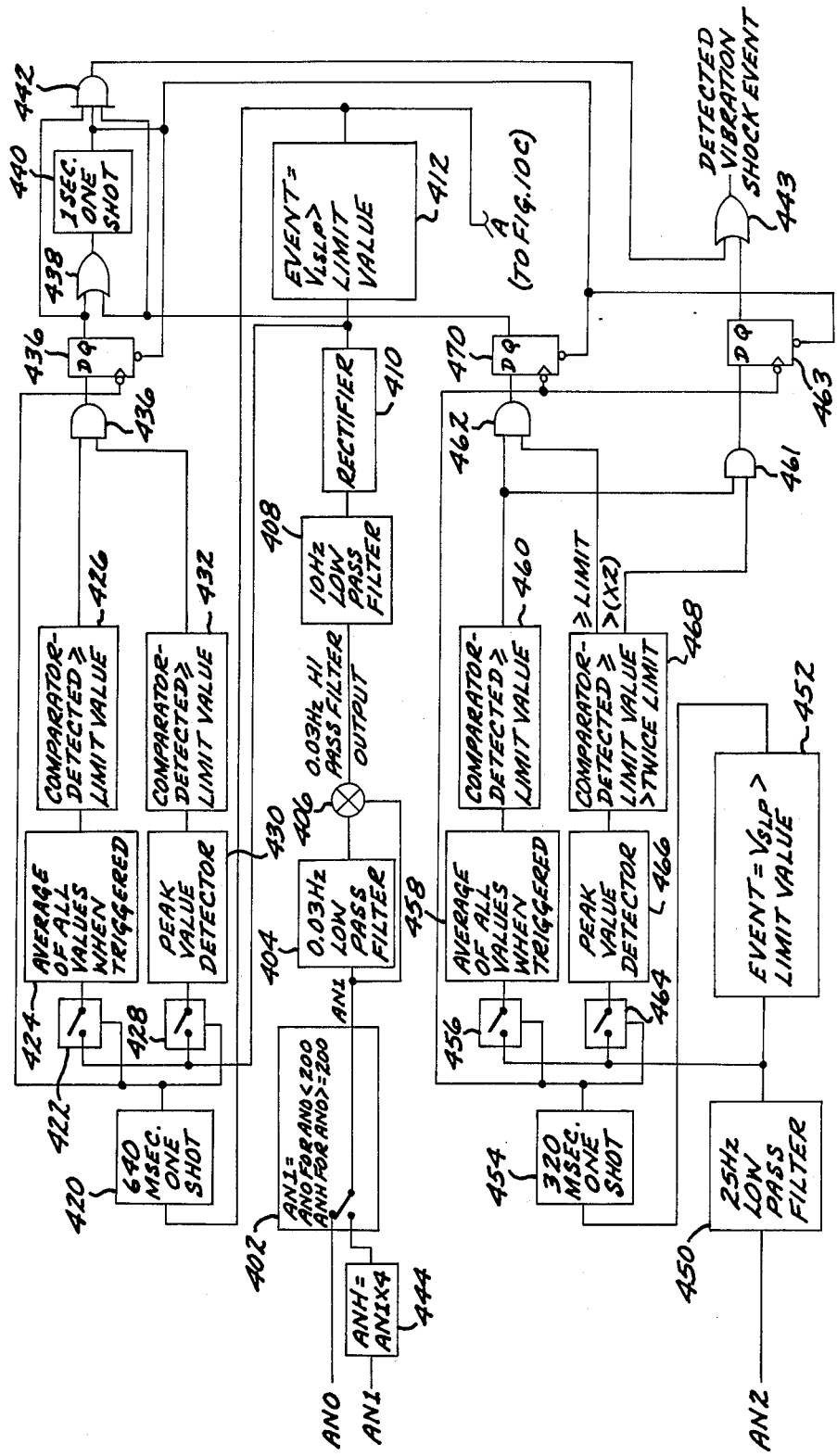
FIGS. 10A–10C are functional and logic block diagrams illustrating the processing of the transducer signals by the sensor system controller during the normal system operating mode.
Figure 10B:
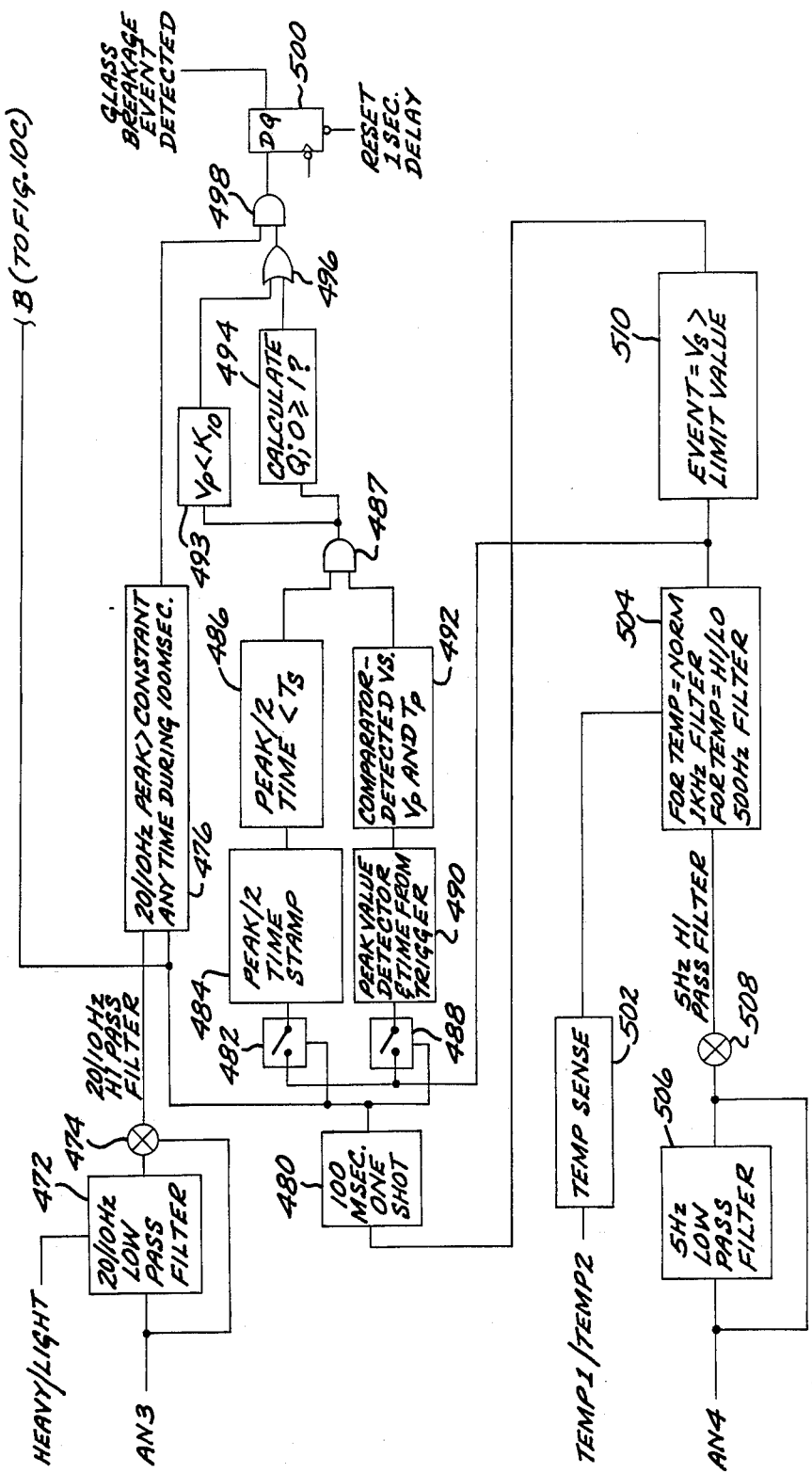
Figure 10C:
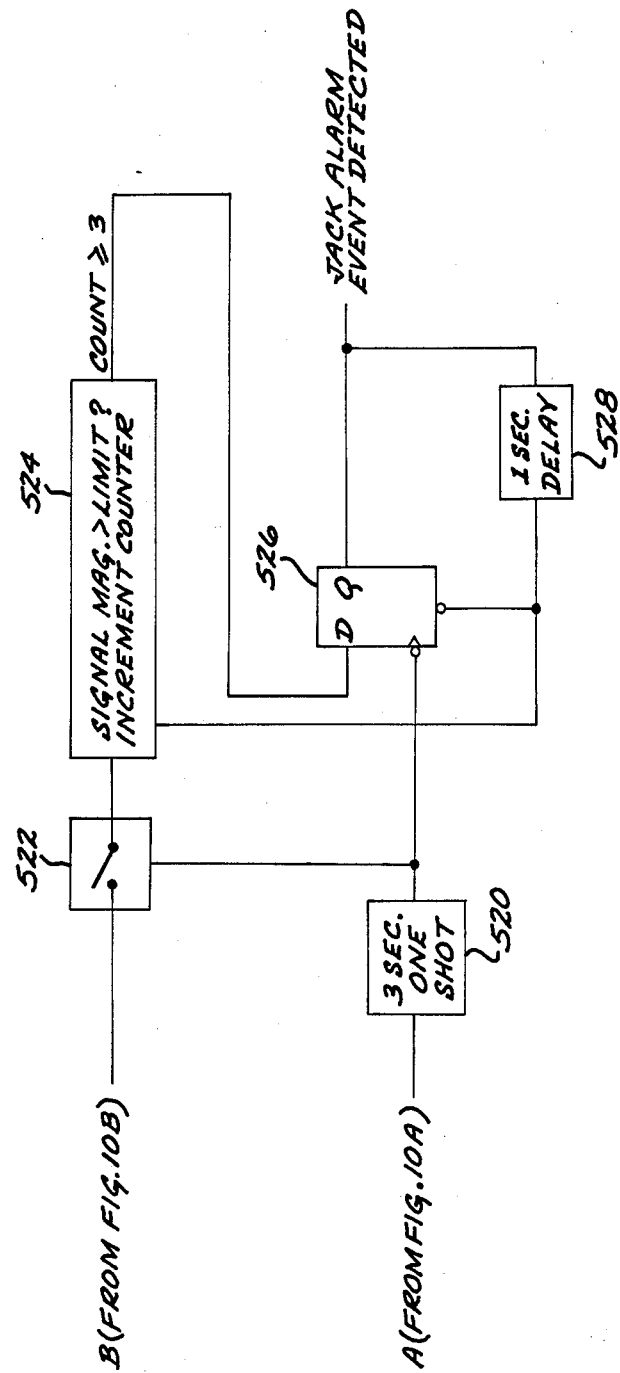

Referring now to FIGS. 10A–10C, the operation of the microprocessor 100 in its normal operating mode is illustrated in this simplified functional and logic block diagram. As will be appreciated by those skilled in the art, the microprocessor 100 is coded so as to emulate the logical and functional operations depicted in FIGS. 10A and 10B.

The signals AN0–AN4, TEMP1 and TEMP2 are inputs to the microprocessor 100, and it will be assumed for purposes of discussion of FIGS. 10A and 10B that these signals have been already been digitized by the A/D converter 100A comprising the microprocessor 100. Signals AN0 and AN1 have in this embodiment digitized 8-bit values with a maximum count value of 256. Signal AN1 is calibrated to the level of signal AN0 by operation 444, wherein the value ANH is set equal to the value of signal AN1 times four. Operation 402 performs the selection between either value AN0 or ANH, setting the output value AN1 equal to AN0 when AN0 is less than 200, and equal to the value of ANH when AN0 is equal to or greater than 200.

The output (ANI) of operation 402, representing the selected one of the AN0 and calibrated AN1 signals, is then passed through low pass filter 404 having a cutoff frequency of 0.03 Hz. Mixer 406 subtracts the low pass filter output from the signal ANI to provide a mixer output signal effectively comprising a 0.03 Hz high pass filter output of the signal ANI. The purpose of this high pass filter is to remove the DC components from the signal ANI. This mixer output signal is in turn passed through 10 Hz low pass filter 408 to remove any higher frequency components, and then through rectifier 410. The rectifying output signal resulting from processing the low frequency signal is then processed by operation 412, and by operations 424 and 430 through switches 422 and 428, as will be described more fully below.

The operation 412 carries out a slope detector function, calculating the difference in value of the filtered, rectified signal ANI over the predetermined time interval $T_{LR}$ for purposes of calculating the parameter $V_{lslp}$, and then compares that parameter against the corresponding programmed (or minimum) limit value. If the difference exceeds the programmed limit value, then a trigger event is declared, triggering the 640 millisecond one-shot operation 420 which in turn causes other parameters to be calculated.

The one-shot operation 420 serves to close switches 422 and 428 for 640 milliseconds and reset flip-flop 436. Operations 424 and 430 are carried out over this 640 millisecond duration. Operation 424 calculates the average value (corresponding to $V_{lav}$) of the filtered, rectified signal ANI sample values over this time interval. Operation 430 determines the peak value (corresponding to $V_{lpk}$) of the same signal over that interval.

In operation 426, a comparison is made between the detected (calculated) average value versus the programmed average limit value, and sets a true value if the detected average value is greater than or equal to the limit value. Similarly, operation 432 performs a comparison of the detected peak value of the filtered, rectified signal ANI versus the programmed peak limit value, and if the detected value is equal to or greater than the programmed limit value, a true output is set. Logical AND function 434 is performed at the end of the 640 millisecond interval on the results of operations 426 and 432, and generates a true signal if, and only if, both inputs also are at a true level. Thus, both operations 426 and 432 must result in a true condition, i.e., both the detected values for $V_{lav}$ and $V_{lpk}$ must equal or exceed the corresponding programmed limit value, in order for the output of the logical AND function 434 to also be true.

The output of the logical AND function 434 is connected to the D input of flip-flop 436, which is clocked by the output of the one shot operation 420. The Q output of the flip-flop 436 is provided as one input to the logical OR function 438. The other input to the OR function 438 is the output of flip-flop 470, to be described below. If either input to the OR function 438 is true, then its output is also true, triggering the one-second, one-shot operation 440. The output of the one-shot operation is true for a one-second interval. Logical AND function 442 is performed on its logical inputs, which are the output from the one-second one-shot operation 440, the Q output of flip-flop 436, and the Q output of flip-flop 470. Only if each input to the AND function 442 is true, will the AND function output be true.

The output from the AND function 442 serves as one logical input to logical OR function 443. The second input is the output of flip-flop 463, which is true for the signal AN2 if the detected value $V_{slp}$ exceeds the programmed limit value and the detected peak value exceeds twice the programmed limit value (AND operation 461). Thus, either a true output from AND function 442 or a true output from flip-flop 463 results in a true output from OR function 443, signaling a detected shock/vibration event. Thus, a low frequency trigger event represented by a true output from AND operation 434 must occur within one second of the high frequency shock/vibration trigger event (represented by a true output of flip-flop 470) in order for a true output of aND operation 442 to be obtained.

The signal AN2 (previously rectified and envelope detected) is passed through a 25 Hz low pass filter operation 450. The filtered AN2 signal is passed through operation 452 and by switches 456 and 464 through operations 458 and 466. The operation 452 is a slope detector operation similar to the operation 412, and determines the corresponding value $V_{slp}$ (FIG. 7) and compares this detected value against the corresponding programmed limit value. If the detected value exceeds the limit value, a true signal from operation 452 is provided, triggering the 320 millisecond one-shot operation 454. Closing switches 456 and 464 for 320 milliseconds and clocking the flip-flop 470.

Operation 458 determined the average value of the filtered signal AN2 over the 320 millisecond interval, corresponding to the value $V_{av}$ (FIG. 7). The operation 466 determines the peak value corresponding to $V_{pk}$ (FIG. 7) over the same interval. The operation 460 performs a comparison of the detected average value against the corresponding limit value. If the detected value exceeds or equals the programmed limit value, then a true output of the comparator 460 is generated.

The operation 468 is also is a comparison operation for comparing the detected peak value against the programmed limit value. A true value is output from the comparator operation 468 if the detected peak value equals or exceeds the limit value.

AND gate 462 symbolizes a logical AND function performed at the end of the 320 millisecond interval on the results of the comparison functions 460 and 468, generating a true output value if and only if both inputs are also true. Thus, the detected values corresponding to $V_{av nd Vpk}$ must both equal or exceed the corresponding limit value in order for the logical AND function 462 to be true. The AND gate output is provided to the D input of flip-flop 470 and the Q output of flip-flop 470 is a logical input to the OR function 438 and to the AND gate 442, as described above. The flip-flop 470 is reset by the output of the 640 millisecond one-shot operation 420.

The signal AN3 is passed through filter 472, a selectable 20/10 Hz low pass filter. The heavy/light input determines whether the filter has a 10 Hz (heavy) or 20 Hz (light) cutoff frequency. The output of the filter 472 is subtracted from its input by mixer operation 474 to provide an effective 10/20 Hz high pass filter operation on signal AN3. This filtered signal is then processed by operations 476 and 478. Operation 476 compares the peak value determined at any time during the 100 millisecond interval of the one-shot operation 480 against a predetermined constant ($K_{12}$). A true value is generated if the detected peak value is greater than the constant value. The output of the operation 476 is provided as a input to logical AND function 498.

The signal AN4 is passed through 5 Hz low pass filter 506. The output of the low pass filter 506 is subtracted from the filter input AN4 by mixer 508 to provide an effective 5 Hz high pass filter output. This filter output is processed by temperature compensation operation 504. Inputs TEMP1 and TEMP2 are provided to inputs to temperature sensing operation 502 which generates a true signal when the ambient temperature is in the normal range (between minus 20° C. and +40° C.), as described above regarding FIG. 5A. The output of the temperature sensing operation 502 determines whether operation 504 is a 1 Khz filter operation when the temperature is in the normal range, or a 500 Hz filter operation when the temperature is either in the high or the low extreme range. The 500 Hz filter operation results in averaging the input signals over four samples, thereby compensating for the unpredictable gain in the microphone when the temperature is in the high or low extreme range. (The alternative temperature compensation technique illustrated in FIG. 5B could also be employed here.)

The output of filter 504 is processed by slope detector operation 510 similar to operation 412 herein above, which determines the value corresponding to $V_s$ (FIG. 9). If the detected value is greater than the corresponding programmed limit value, then a true output is generated. The true output of operation 510 triggers the 100 millisecond one-shot operation 480. The one-shot 480 output triggers operation 476 and closes switches 482 and 488, providing the filtered AN4 signal to operations 484 and 490. Operation 490 determines the peak value of the filtered AN4 signal over the 100 millisecond interval and as well the relative time at which the peak value occurs from the trigger event for the one-shot operation 480. Operation 492 compares the detected time at which the peak value occurs against a programmed limit value (having a minimum value of $K_8$), and if the detected time is less than the value for $T_p$ (FIG. 9) which corresponds to the detected value of $V_p$ (either 20 or 35 milliseconds), a true value is generated. Operation 484 determines the time corresponding to $T_s$ (FIG. 9) at which the signal value decays from the peak to one-half the peak value. Operation 486 is a comparison operation for comparing whether the time stamp value resulting from operation 484 is less than the value for $T_s$ corresponding to the detected value for Vp (either 25 or 100 milliseconds). If so, then a true signal is generated by operation 486.

The outputs from operations 486 and 492 then drive the logical AND operation 487. If both inputs are true, then the parameter Q is calculated at operation 494, which provides a true output if Q equals or exceeds one. A true output from the AND operation 487 also triggers comparison operation 493, which generates a true output if the peak value $V_p$ exceeds the constant $K_{10}$. The outputs from operations 493 and 494 are provided as inputs to logical OR operation 496.

If either set of conditions presenting the input to OR gate 496 is true, then the output of OR gate 496 will be true. This output is an input to AND gate 498. The other input to this AND gate is the output from the operation 476. If both the OR gate 496 output is true and the output from operation 476 is true, then the AND gate 498 generates a true value as an input to flip-flop 500. The output of the flip-flop 500 is the glass breakage event detected signal. The flip-flop 500 is reset by a one-second delay operation.

FIG. 10C illustrates the jack alarm feature of the system. Input "A" from FIG. 10A is the output from the slope detector 412 (FIG. 10A) which provides a true output when the signal parameter $V_{lslp}$ exceeds the limit value. Input "B" from FIG. 10B is the signal AN3 after having been filtered by the 20/10 Hz low pass filter. A true value at input "A" triggers a three second, one-shot device 520, whose output temporarily closes the switch 522 for the one second time interval and applies the filtered AN3 signal to the comparator and counter 524. During the three second interval, each time the signal magnitude of the constant $K_{13}$, the counter 524 is incremented. If the count value exceeds 3 during this interval, a true output signal is applied to the flip-flop 526. A true output from flip-flop 526 signifies tat a jack alarm event has been detected. The counter 524 is rest by the true output of one second delay 528.

It is understood that the above-described embodiment is merely illustrative of the possible specific embodiments which may represent principles of the present invention. Other arrangements may readily be devised in accordance with these principles by those skilled in the art without departing from the scope of the invention.

What is claimed is:

1. A user-programmable sensor system for detecting shock/vibration disturbance events to a vehicle, the system comprising:

a shock/vibration transducer responsive to shock/vibration disturbance events to the vehicle and for generating electrical transducer signals indicative of the amplitude and frequency content of such shock/vibration;

program mode entry means for providing a program mode signal indicating that the sensor system is to be configured in a program mode;

memory means for storing a plurality of signal parameter limit values;

controller means responsive to said transducer signals and to said program mode signal, said controller means comprising:

means responsive to said transducer signals for calculating parameter values indicative of predetermined parameters of said transducer signal;

means for comparing said calculated parameter values with said stored limit values;

means responsive to said comparing means for triggering an alarm output signal when said calculated parameter values exceed corresponding ones of said stored limit values;

means responsive to said program mode signal for placing said system in a program mode, said means further responsive to said parameter values calculated as a result of shock/vibration disturbances occurring while the system is configured in the program mode for storing in said memory new parameter limit values, whereby the sensitivity of the system to shock/vibration disturbances may be programmed by the system user with the system configured in the programming mode by causing a shock/vibration disturbance to the vehicle desired to trigger an alarm output signal.

2. The sensor system of claim 1 wherein said signal parameter limit values have corresponding predetermined minimum values associated therewith stored in said memory means, and wherein said respective signal parameter limit values are set to the greater of said respective predetermined minimum values and said respective new parameter limit values calculated during said program mode, whereby said predetermined minimum values determine the predetermined maximum sensitivity of said system to shock/vibration disturbances.

3. The sensor system of claim 1 wherein said program mode entry means comprises a vehicle user-actuated program switch and means for providing a user-perceptible signal that the system is configured in the program mode.

4. The sensor system of claim 1 wherein said program mode is automatically terminated after a predetermined time interval after the system was initially configured in the program mode.

5. A user-programmable sensor system for detecting shock/vibration disturbance events to a vehicle, the system comprising:

a shock/vibration transducer responsive to shock/vibration disturbance events to the vehicle and for generating electrical transducer signals indicative of the amplitude and frequency content of such shock/vibration;

means for processing said transducer signals to provide a plurality of electrical channel output signals, each indicative of the energy content of said transducer signals within a particular frequency band;

program mode entry means for providing a program mode signal indicating that the sensor system is to be configured in a program mode;

memory means for storing a plurality of signal parameter limit values;

controller means responsive to said transducer signals and to said program mode signal, said controller means comprising:

means responsive to at least one of said channel output signals for calculating parameter values indicative of predetermined parameters of said transducer signals;

means for comparing said calculated parameter values with said stored limit values;

means responsive to said comparing means for triggering an alarm output signal when said calculated parameter values equal or exceed corresponding ones of said stored limit values; and means responsive to said program mode signal for placing said system in a program mode, said means further responsive to parameter values calculated as a result of shock/vibration disturbances occurring while said system is configured in the program mode for storing in said memory new parameter limit values, whereby the sensitivity of the system to shock/vibration disturbances may be programmed by the user with the system configured in the programming mode by causing a shock/vibration disturbance to the vehicle of a level desired to trigger an alarm output signal.

6. The system of claim 5 wherein said transducer comprises a three axis accelerometer for generating X, Y and Z axis component signals respectively indicative of acceleration along the respective X, Y and Z axes.

7. The system of claim 6 wherein said transducer comprises means for summing the X, Y and Z axis signals to comprise said transducer signals.

8. The system of claim 5 wherein said processing means comprises a very low bandpass filter for providing a first channel output signal indicative of the energy content of said transducer signals within a predetermined very low frequency band, and a relatively high pass filter for attenuating signal components below a relatively higher frequency above said predetermined very low frequency band and providing a second channel output signal indicative of the energy content of said transducer signals above said relatively higher frequency.

9. The system of claim 8 wherein said very low frequency band extends from about 0.16 Hz to about 0.8 Hz.

10. The system of claim 8 wherein said relatively higher frequency is about 120 Hz.

11. The system of claim 8 wherein said filtering means further comprise a second bandpass filter for providing a third channel output signal indicative of the energy content of said transducer signals; within a second predetermined frequency range, and wherein said system further comprises:
an acoustic transducer for converting acoustic energy into an acoustic transducer electrical signal; and
wherein said processing means further comprises means responsive to said acoustic transducer signal and to said third channel output signal for calculating predetermined parameter values characterizing said transducer signal and triggering an acoustic event signal when said parameters of said transducer signal meet or exceed predetermined limit levels and when a predetermined parameter of said third channel output signal exceeds a predetermined limit value within a predetermined time interval of said acoustic transducer signal parameters exceeding said corresponding limit values,
thereby reducing system false alarms by requiring cross-correlation of the acoustic transducer signals with shock/vibration signals to trigger an acoustic event signal.

12. The system of claim 11 wherein said second predetermined frequency range is from about 20 Hz to about 100 Hz.

13. The system of claim 5 further comprising:
(i) a glass breakage detector comprising an acoustic transducer for converting incident acoustic energy into an electrical acoustic transducer signal;
(ii) high pass filter means for attenuating lower audio frequency components of said transducer signal to provide a signal indicative of the energy content of said signal at higher audio frequencies; and
(iii) wherein said processing mean further comprises means responsive to said filtered transducer signal and to one of said channel output signals for calculating values of predetermined parameters characterizing said acoustic transducer signal and triggering an acoustic event signal when said calculated values meet or exceed predetermined limit values, and for generating an alarm output signal when several predetermined parameters of said filtered acoustic signal simultaneously exceed certain limit values to create a glass breakage trigger event and when said channel output signal cross-correlates with said trigger event.

14. The system of claim 13 wherein said predetermined parameters characterizing said acoustic transducer signal comprise the magnitude of the rise in the signal magnitude over a predetermined time interval and the peak signal magnitude.

15. The system of claim 5 wherein said system is installed in a vehicle for detecting alarm events involving said vehicle, and further comprising means for detecting that the vehicle is being jacked up, said means comprising:
a second plurality of threshold values stored in said memory which define parameters of one or more of said shock/motion transducer signals characteristic of shock/motion caused by jacking said vehicle; and
said processing means further comprises means for comparing said channel output signals to said second plurality of threshold values; and
means for generating an alarm signal when said channel output signals exceed said threshold values.

16. The system of claim 5 wherein said processing means comprises analog-to-digital converter means for converting said channel output signals into corresponding digital signals; and said controller comprises a microprocessor responsive to said digital signals.

17. A sensor for detecting glass tampering events in vehicles and the like, comprising:
an acoustic energy transducer comprising means for generating electrical transducer signals indicative of a magnitude and frequency content of incident acoustic energy above a predetermined frequency;
means for processing said transducer signals to provide processed transducer signals;
means for storing predetermined parameter limit values representing predetermined parameters of said transducer signals generated as a result of excitation of said glass, said parameter limit values being characteristic of glass tampering sounds, said parameters comprising, for a given acoustic event, (i) the rise in magnitude of the processed transducer signal over a time interval of predetermined duration commencing upon rise in said magnitude from a quiescent level, (ii) the peak magnitude of the processed signal, and (iii) a predetermined period duration of the processed transducer signal;
controller means responsive to said processed transducer signals comprising:
(i) means for determining the rise in the magnitude of said processed transducer signal for a sensed acoustic event over said time interval;
(ii) means for determining the peak magnitude and said period duration of said processed signal for said sensed acoustic event;
(iii) means for comparing said rise in magnitude value, said peak magnitude value and said period duration value to corresponding predetermined limit values; and
(iv) means responsive to said comparing means for providing a glass tampering event trigger signal based on an acoustic event when predetermined conditions are met, including the conditions that said rise in magnitude value and said peak magnitude values exceed predetermined limit values, and said period duration value is less than a predetermined limit value.

18. The sensor of claim 17 wherein said transducer comprises a microphone, and said controller further comprises means for compensating for microphone gain variations resulting from variations in the ambient temperature.

19. The sensor of claim 17 further comprising:
means for detecting shock/vibration events and providing a detector signal indicative of the amplitude of predetermined frequency components of said shock/vibration;
means for comparing said detector signal against a predetermined limit value and providing a shock/vibration event trigger signal when said detector signal magnitude exceeds said limit value; and
means responsive to said glass breakage event trigger signal and said shock/vibration event trigger signal for declaring an alarm event when there is an occurrence of said respective glass tampering and shock/vibration event trigger signals within a predetermined time interval.

20. The sensor of claim 17 wherein said processing means comprises means for rectifying and envelope detecting said transducer signal.

21. A sensor system for detecting shock/vibration disturbance events to a vehicle, the system comprising:
- a shock/vibration transducer responsive to shock/vibration disturbance events to the vehicle and for generating electrical transducer signals indicative of an amplitude and frequency content of such shock/vibration;
- means for processing said transducer signals to provide a plurality of electrical channel output signals, each indicative of the energy content of said transducer signals within a particular frequency band, said processing means comprising a first channel comprising a very low frequency band pass filter for filtering said transducer signals and providing a first channel output signal indicative of the energy of said transducer signals, and a second channel comprising a high pass filter for filtering said transducer signal and providing a second channel output signal indicative of the energy content of said signal above the cutoff frequency of said high pass filter;
- memory means for storing a plurality of signal parameter limit values;
- controller means responsive to said transducer signals, said controller means comprising:
  - means responsive to at least one of said channel output signals for calculating parameter values indicative of predetermined parameters of said transducer signals, said parameters including the rise in values of said first and second output signals over a predetermined time interval, and the peak value of said second channel output signal;
  - means for comparing said calculated parameter values with corresponding ones of said stored limit values;
  - means responsive to said comparing means for triggering an alarm output signal when said calculated parameter values equal or exceed corresponding ones of said stored limit values.

22. The system of claim 21 wherein said transducer comprises a three axis accelerometer for generating X, Y and Z axis component signals respectively indicative of acceleration along the respective X, Y and Z axes.

23. The system of claim 21 wherein said very low frequency band extends from about 0.16 Hz to about 0.8 Hz.

24. The system of claim 21 wherein said relatively higher frequency is about 120 Hz.

25. The sensor system of claim 21 wherein said calculated parameters further comprise the average value of said channel output signal over a predetermined time interval.

* * * * *